E. D. ROCKWELL.
VALVE STEM CAP.
APPLICATION FILED JULY 8, 1920.

1,423,541.  Patented July 25, 1922.

Inventor
Edward D. Rockwell
By
his Attorneys

UNITED STATES PATENT OFFICE.

EDWARD D. ROCKWELL, OF BRISTOL, CONNECTICUT.

VALVE-STEM CAP.

1,423,541.  Specification of Letters Patent.  Patented July 25, 1922.

Application filed July 8, 1920. Serial No. 394,662.

*To all whom it may concern:*

Be it known that I, EDWARD D. ROCKWELL, a citizen of the United States, residing at Bristol, in the county of Hartford and State of Connecticut, have invented certain new and useful Improvements in Valve-Stem Caps; and I do hereby declare the following to be a full, clear, and exact description of the same, reference being had to the accompanying drawings, forming part of this specification.

This invention relates to dust caps or valve stem caps now in general use on automobiles for enclosing the valve stem of pneumatic tires and preventing the entry of dust into the valve. The caps and valve stems now in use are elongated and the stem has a series of screw-threads on its exterior with which a corresponding extended series of screw-threads on the interior of the cap engage to secure the cap on the stem. When it is desired to remove or apply the cap it is necessary to give the cap a considerable number of rotations, consuming an appreciable length of time and rendering this form of cap objectionable.

One object of the present invention, therefore, is to provide a dust cap for pneumatic tire valve stems that can be applied to the stem by pushing it directly down on the stem and that is removable by merely pulling it straight off. No rotation of the cap or stem is necessary, greatly reducing the time required for either operation, and the cap is securely held on the stem until its removal is desired.

Figure 1:
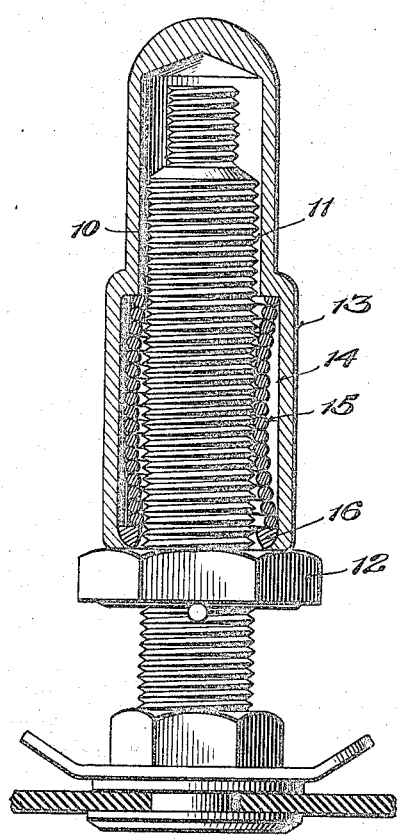
Figure 1 is a sectional view, taken longitudinally of the cap, showing a valve stem and cap embodying the present invention.

As shown in the drawings the valve stem 10 is of the type now in general use. The valve end of the stem 10 projects radially of the wheel inwardly through the rim, a plurality of screw threads 11 being provided on said end. A nut 12 is shown on stem 10 at about the position it would occupy allowing for the thickness of the wheel rim. The series of screw threads 11 is of considerable length and, as before mentioned, if the cap is adapted to be secured to the stem by said screw-threads and cooperating screw-threads of the cap it is necessary to give the cap quite a number of revolutions when applying or removing it. In the present invention the necessity of rotating the cap and the consequent loss of time is eliminated by the provision of means that will normally hold the cap securely on the stem but, at the same time, will permit the cap to be placed on or removed from the stem by a movement of the cap substantially parallel to the axis of the cap.

The preferred embodiment of the invention is illustrated in the accompanying drawings and consists in providing the cap 13 with an annular recess 14 in its interior wall, and secured in said recess 14 is a coil spring 15 preferably made of material whose cross-section is considerably greater than the pitch of threads 11 on the stem. Spring 15 is retained in the recess 14 by a ring 16 spun in the bottom of the cap and forming one end wall of the recess although if desired ring 16 may be dispensed with and the end of the cap itself spun in to retain the spring. The coils of spring 15 are wound in the same direction as that given the threads 11 on the stem and said spring is of greater length than the recess 14, the coils of said spring being wound a short distance apart to permit the spring to be compressed longitudinally of the cap. When secured in the cap as before described, the spaced coils of the spring are compressed between the end walls of recess 14 and the frictional engagement between said spring and end walls prevents the cap rattling on the stem.

Figure 2:
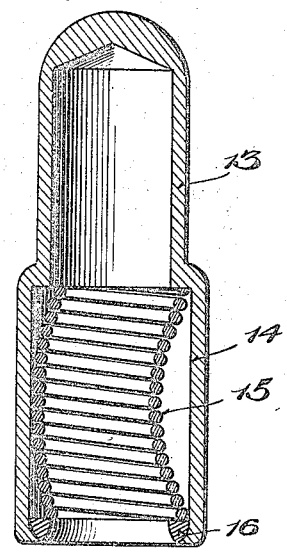
Figure 2 is a similar view of the cap removed from the stem.
Figure 3:
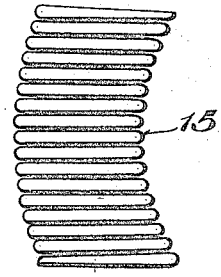
Figures 3 and 4 are detail views of springs for locking the cap on the stem.

Spring 15 is distorted transversely of the cap to form a tortuous passage through which the stem extends, the distortion of said spring being gradual to permit easy entry of the stem. In a spring such as shown in Figs. 1 to 3 the end coils and one or more of the intermediate coils project inwardly from the wall of the cap an appreciable distance but when the cap is placed on the stem 10 the spring must straighten out nearly parallel to the stem. The distorted coils, however, will protrude from the wall of the cap enough to frictionally engage with the threads on the stem, the intermediate distorted coils engaging the stem on one side intermediate the distorted end coils on the opposite sides of the stem. This frictional engagement between the spring 15 and stem 10 will normally prevent any longitudinal movement of the cap on the stem but if an abnormal force is applied to the cap, such as is manually applied when the cap is to be removed, the cap can be readily pulled straight off the stem. Likewise, when the cap is to be replaced it is only necessary to push it down on the stem, no rotation of the cap being necessary to lock it.

Figure 4:
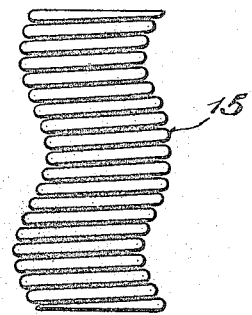

The form of spring shown in Fig. 4 is of greater length and is provided with a greater number of distorted coils. With an increased number of points of contact between the spring 15 and stem 10 any objectionable rattling of the cap that might develop with the shorter form of spring is eliminated. It will be understood, of course, that with a spring of greater length, as shown in Fig. 4, the width or depth of recess 14 in the cap will be correspondingly increased.

An important feature of the present invention is that the spring, if desired, need not be attached firmly to the cap but is comparatively loose in the recess 14, the frictional engagement between the spring and end walls of the recess not being very strong, and any amount of turning, thoughtlessly or on purpose, of the cap 12 will not loosen the contact of the spring 15 or break said spring as might be done if the spring were attached firmly at any one point to the cap. This feature also prevents vibrations loosening the contact of the spring and only a straight pull can loosen said contact.

What I claim is:

1. The combination of a hollow cap for threaded valve stems and a transversely distorted coil spring secured in the interior of said cap, the cross section of the material of which said spring is formed being greater than the pitch of the threads on the stem.

2. The combination of a valve stem cap, an annular shoulder on the interior of the cap, said cap being of increased diameter intermediate one of its ends and said shoulder, and a transversely distorted coil spring extending longitudinally of the enlarged portion of the cap, the end of the cap adjacent the spring being turned inwardly to prevent displacement of the spring.

3. The combination of a valve stem cap for threaded valve stems, longitudinally spaced annular shoulders on the interior of the cap, and a transversely distorted spring composed of a series of spaced helically disposed coils held within the cap between said shoulders and adapted to interlock with the threads on the valve stem, said spring being of greater length than the distance between said shoulders and compressed between said shoulders whereby the spring and cap are frictionally secured together and rattling of the cap prevented, and said cap being rotatable on the stem independently of the spring.

EDWARD D. ROCKWELL.